J. C. PRYOR.
PROCESS OF EXTRACTING SILVER FROM ITS ORES.
APPLICATION FILED NOV. 18, 1908.
918,908.
Patented Apr. 20, 1909.
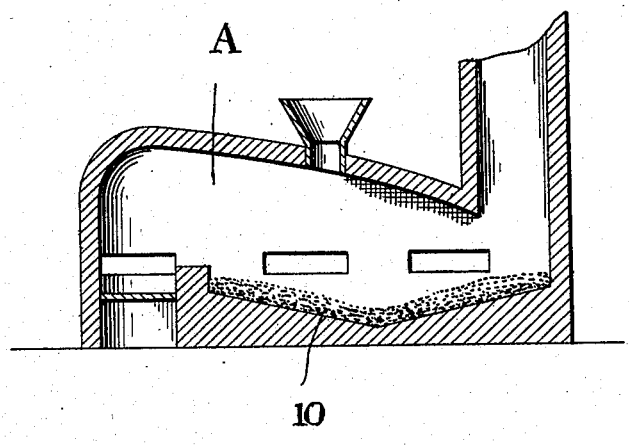
WITNESSES
INVENTOR
J.C. PRYOR
BY
ATT'Y.

UNITED STATES PATENT OFFICE.

JAMES CHARLES PRYOR, OF NORTH BAY, ONTARIO, CANADA.

PROCESS OF EXTRACTING SILVER FROM ITS ORES.

No. 918,908.        Specification of Letters Patent.        Patented April 20, 1909.

Application filed November 18, 1908. Serial No. 463,308.

*To all whom it may concern:*

Be it known that I, JAMES CHARLES PRYOR, of Trout Mills, North Bay, in the Province of Ontario, Canada, have invented certain new and useful Improvements in Processes for Extracting Silver from Its Ores, and do hereby declare that the following is a full, clear, and exact description of the invention, which will enable others skilled in the art to which it appertains to make and use the same.

My invention relates to improvements in processes of extracting silver from its ores, particularly arsenical ores containing silver with cobalt and nickel and iron.

The objects of my invention are to provide a simple and effective process which will recover separately the different metals of the ore, the steps of the process being described more fully in detail in the accompanying specification and drawings.

The drawings illustrate an ordinary type of reverberatory furnace which may be used to carry out the process in.

In carrying out the process the ore itself, such as smaltite, or a concentrate thereof, is first smelted in a suitable manner to form a speiss, and this speiss is then calcined as far as practicable, as by heating it in the presence of a supply of air on the hearth 10 of a suitable reverberatory furnace A. During this calcination part of the arsenic is vaporized leaving oxids of cobalt, nickel and iron, and part is oxidized and remains combined with a portion of the oxids of cobalt, nickel and iron, forming arsenates of these metals. The oxids so produced are then subjected to the action of a suitable reagent to reduce them to metallic form. As one reagent which might be used I would mention producer gas, and this could be conveniently introduced and passed over the ore while it remained on the hearth of the furnace after the heating had ceased. This reagent as well as reducing the metals will change the arsenates formed in calcination, to arsenids. The mass of reduced metals and arsenids is then treated with a solvent which will dissolve all the metals except the silver and the insoluble arsenids—that is to say the oxids of cobalt, nickel and iron will be reduced to metallic condition, while the arsenates of these metals will be reduced to arsenids. Suitable solvents which may be used are diluted sulfuric acid or hydrochloric acid. It may here be explained that there is no danger of any silver being dissolved by the acid so long as any of the electro-positive metals, cobalt, nickel or iron, are present. The insoluble residue containing silver with arsenids of cobalt, nickel and iron is then subjected to a second treatment of calcining, reducing with producer gas, and acid treatment, as before. This second treatment will oxidize the arsenids to arsenates and the majority of the cobalt, nickel and iron will be reduced by the producer gas to metallic form. Finally the silver will be sufficiently free from associated impurities to refine by cupellation. It will be readily understood that it might be possible to apply the cupellation process to free the silver from impurities immediately after the first treatment.

In certain cases it might be necessary to repeat the process on the residue of silver and non-soluble arsenids, this repetition involving the calcining reducing and acid treatment.

It is of course well known in the art to calcine an ore in order to facilitate separation of the metals, but in the present process this oxidation and subsequent reduction are only used as a preliminary to the separation of the metals themselves, by the dissolution of the base metals.

It will be readily understood that while the processes are described herein with considerable detail yet in carrying out the same changes within the scope of the claims may be made without departing from the spirit of the invention, the details given herein being interpreted as illustrative and not in a limiting sense.

What I claim as my invention is:

1. The herein described method of eliminating the baser metals from an ore containing silver with baser metals, which consists in first calcining the ore to oxidize the metals therein; then treating the oxidized ore with a suitable reagent to reduce the oxids so formed; then treating the mass with a solvent of the baser metals substantially as hereinbefore set forth and described.

2. The herein described method of eliminating the baser metals from an ore containing silver with arsenids of the baser metals, which consists in first smelting the ore to produce a speiss, then calcining the speiss, then reducing the calcined compound by suitable reagents, and then dissolving the baser metals, substantially as hereinbefore described and set forth.

3. The herein described method of eliminating the baser metals from an ore containing silver with the arsenids of the baser metals, which consists in first smelting the ore to form a speiss, then crushing the speiss then calcining the same, then reducing the oxids formed by calcination to metallic form, then treating the mixture with a solvent of the baser metals, and then repeating the process on the residue.

In witness whereof I have hereunto set my hand in the presence of two witnesses.

JAMES CHARLES PRYOR.

Witnesses:
F. B. WAKEFIELD,
G. F. DUCKWORTH,